United States Patent
Anderson et al.

(10) Patent No.: US 7,084,083 B2
(45) Date of Patent: *Aug. 1, 2006

(54) RADIANT AND CONVECTIVE HEAT RESISTANT MATERIAL

(75) Inventors: Leslie Leah Anderson, Missoula, MT (US); Mary Ann Davies, Missoula, MT (US); Anthony Clement Petrilli, Florence, MT (US); Mark Y. Ackerman, Sherwood Park (CA)

(73) Assignees: The United States of America as represented by the Secretary of Agriculture, Washington, DC (US); The Governors of the University of Alberta, Edmonton (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/742,462

(22) Filed: Dec. 19, 2003

(65) Prior Publication Data

US 2005/0019619 A1    Jan. 27, 2005

Related U.S. Application Data

(62) Division of application No. 10/286,176, filed on Nov. 1, 2002, now Pat. No. 6,881,506.

(51) Int. Cl.
*B27N 9/00*     (2006.01)
*E04H 15/56*    (2006.01)
*E04H 15/40*    (2006.01)
*D03D 15/00*    (2006.01)
*B32B 15/14*    (2006.01)

(52) U.S. Cl. .............. 442/233; 428/920; 428/921; 442/235; 135/116; 135/126; 135/137

(58) Field of Classification Search .......... 428/920, 428/921; 442/228, 233, 235, 232, 234; 135/116, 135/124, 137, 126
See application file for complete search history.

(56) References Cited

U.S. PATENT DOCUMENTS

| | | | | | |
|---|---|---|---|---|---|
| 2,266,853 | A | * | 12/1941 | Dabney | 135/116 |
| 4,034,772 | A | * | 7/1977 | Huddle | 135/137 |
| 4,627,199 | A | * | 12/1986 | Capaul | 428/448 |
| 5,001,783 | A | * | 3/1991 | Grilliot et al. | 428/920 |
| 5,277,959 | A | * | 1/1994 | Kourtides et al. | 428/920 |
| 5,436,075 | A | * | 7/1995 | Sawko | 428/375 |
| 5,681,640 | A | * | 10/1997 | Kiser | 428/181 |
| 6,672,323 | B1 | * | 1/2004 | Gupta et al. | 135/137 |

* cited by examiner

*Primary Examiner*—Elizabeth M. Cole
*Assistant Examiner*—Jeremy R. Pierce
(74) *Attorney, Agent, or Firm*—John F. Fado; Lesley E. Shan; Janet I. Stockhausen

(57) ABSTRACT

The invention is a new heat and fire resistant material. The material is made of a woven silica-based cloth layered in several possible combinations with foil and fiberglass cloth layers. The layers can be arranged in a variety of sequences to minimize the thermal radiation to the inside of the material, but a foil layer must always be the outermost layer to provide protection from radiant heat.

10 Claims, 4 Drawing Sheets

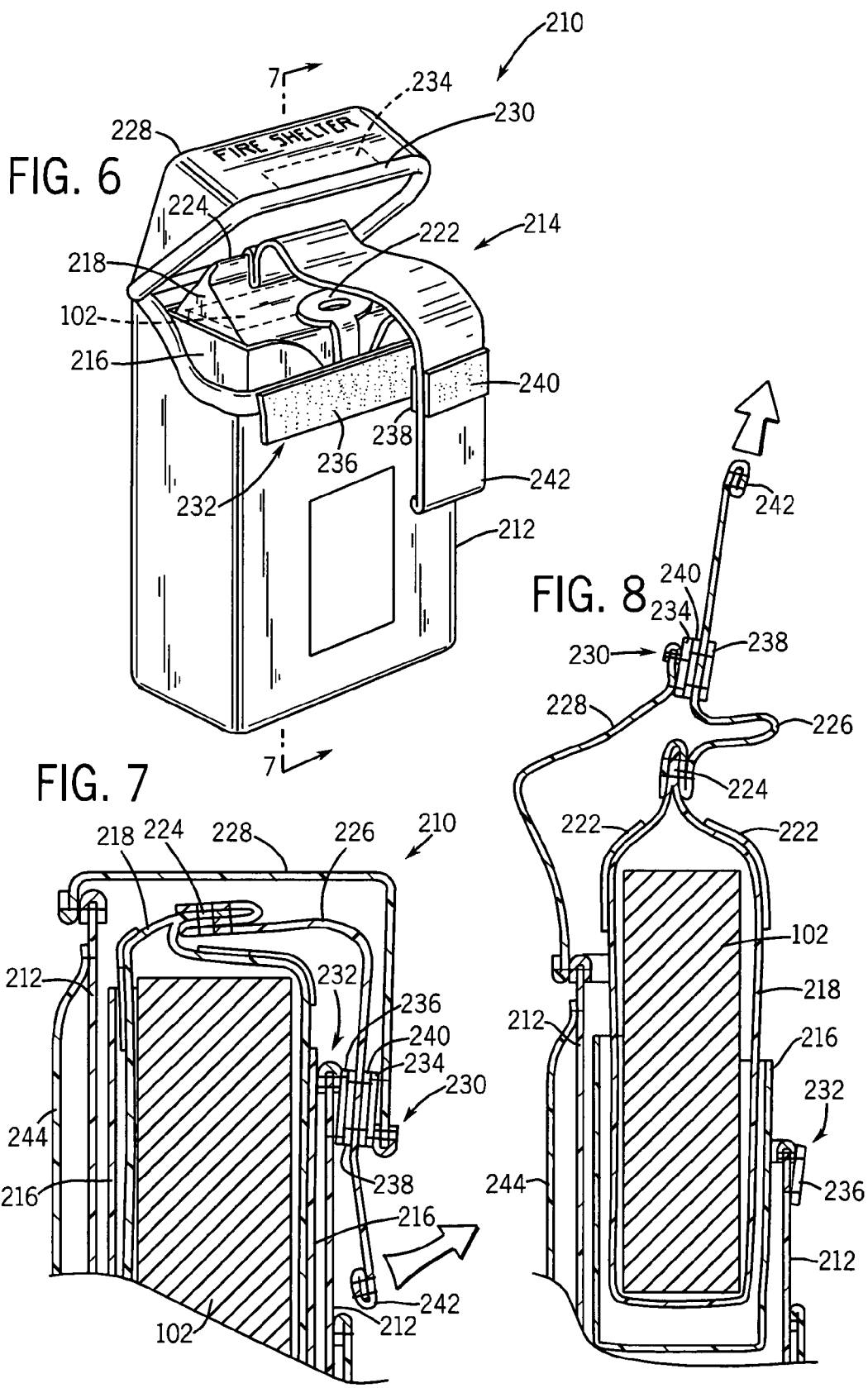

RADIANT AND CONVECTIVE HEAT RESISTANT MATERIAL

RELATED APPLICATIONS

This application is a divisional of U.S. patent application Ser. No. 10/286,176, filed Nov. 1, 2002, now U.S. Pat. No. 6,881,506, the contents of which are incorporated herein by reference in their entirety.

STATEMENT OF FEDERAL SPONSORSHIP

The Government of the United States of America has rights in this invention.

FIELD OF THE INVENTION

The present inventive subject matter relates to materials that are resistant to radiant and convective heat. More particularly, the present invention relates to a novel emergency fire shelter constructed of the heat and fire resistant materials. The present invention also relates to a kit containing an emergency fire shelter that can be quickly deployed in the event of danger from a wildland fire.

BACKGROUND OF THE INVENTION

An emergency fire shelter is a compact, tent-like structure providing emergency protection to a firefighter trapped by a rapidly advancing forest fire. The fire shelter is constructed of materials that are resistant to radiant and convective heat. An example of such a material is a heat-reflecting foil bonded to the outside of a fiberglass cloth. A combination of flexible materials allows the fire shelter to be accordion folded into a compact brick that can be carried with the firefighter at all times. Thus, the selection of materials for use in the construction of an emergency fire shelter is critical to its effectiveness.

Several layered materials are designed to provide a shield from a variety of environmental hazards including heat and fire. However, there is a need for an improved light, flexible, and strong material which provides protection from radiant and convective heat. Such a material would not only be used in construction of emergency fire shelters, but could also be used as a shield against fire and heat in other settings including, for instance, fire barriers, heat shields, fire proof curtains and the like.

Emergency fire shelters in use today share the same form as a pup tent, triangular in shape. Such a design is illustrated by U.S. Pat. No. 5,921,388 to Petrilli et. al. A problem with emergency fire shelters currently used is that they have flat, triangular ends that are perpendicular to the ground and reflect radiant energy. Reflection of this energy to the ground immediately adjacent to the fire shelter increases the likelihood that fire will start adjacent to the shelter, thus allowing damage to the fire shelter prior to the arrival of the flame front. Accordingly, there is a need for an emergency fire shelter design that minimizes such heat transfer. More information on prior art fire shelters and their use is contained in "Your Fire Shelter" and "Your Fire Shelter, Beyond the Basics" published by the United States Department of Agriculture, Forest Service, Technology and Development Program, under Codes NFES 1750 and 2179, hereby incorporated by reference.

An emergency fire shelter is inevitably deployed under emergency situations and time is frequently of the essence. Ideal deployment is in an area removed from large amounts of combustible material. For this reason, the initial stages of deployment may occur while the firefighter is running to a safe deployment area. When using many of the prior art fire shelters, the removal of the fire shelter from its carrying case may be hampered by the firefighter's dropping of his or her backpack to obtain greater mobility and to jettison dangerous combustible materials such as fusees.

Accordingly, it is desirable to provide an emergency fire shelter that is easier and faster to deploy. Such a shelter would require ease of transport by fire fighters and protection during prolonged periods of storage.

DESCRIPTION OF THE RELATED ART

Various layered materials are designed to provide a shield from a variety of environmental hazards such as heat and fire. The designs vary depending on the application for which the material is to be used. These designs include fabrics as well as composite designs.

U.S. Pat. No. 6,048,805 discloses a fire, heat and backdraft protection system for protecting firefighters in all types of fires. The protection system includes a composite laminate structure having a plurality of layers for the protection of firefighters who are exposed to high temperatures of 2200 degrees Fahrenheit for 30 minutes in duration. The plurality of layers includes an outer first layer, an inner second layer and an inner third layer. The outer first layer is a fiberglass textile having an intumescent coating resistant to heat, water and impact. The inner second layer is a metal foil layer for reflecting heat and eliminates the convection transfer of heat. The inner third layer is a low conductivity refractory blanket for reducing the transmission of heat. The inner fourth layer is a metal foil layer for reflecting heat and eliminates the convection transfer of heat.

U.S. Pat. No. 5,830,319 discloses a flexible fire barrier felt that includes an organic polymeric binder; a phosphorus-containing compound; organic fibers with pendant hydroxyl groups; and a heat absorbing compound. The flexible fire barrier felt is comprised of at least 10 wt-% of an organic polymeric binder; at least about 5 wt-% of organic fibers having pendant hydroxyl groups; and at least about 10 wt-% of a heat absorbing compound; wherein the felt contains at least about 0.3 wt-% phosphorus, as provided by a phosphorus-containing compound; and wherein all weight percentages are based on the total dry weight of the felt.

U.S. Pat. No. 5,645,926 discloses a flexible fire and heat resistant material comprising an intimate mixture of organic intumescent filler and organic fibers adapted to char intensely within the temperature range of 200° C. to 500° C. The added presence of inorganic fiber components enhances the structural integrity of this structure both during char formation up to 500° C. and at higher temperatures up to 1200° C. once char oxidation takes place.

Some fire shelters and tents presently being used have generally rounded features. Examples of tents found in the prior art as listed below.

U.S. Pat. No. 5,645,926 discloses a tent with a fabric layer over one or more arch poles, wherein said pole or poles is tensionable by means of tensioning members connected between upper and lower points of each said pole. More particularly, the tent is comprised of a fabric layer over one or more flexible resilient poles having opposed pole ends, each pole being arched and defined within a respective generally vertical plane. The tent has a longitudinal axis generally perpendicular to the plane of the poles, each pole being oriented such that the pole ends define lower points and a region of the pole intermediate the pole ends defines an upper point. A pair of tensioning members connected to the poles, each tensioning member having opposed ends connected at one end to the upper point of the pole and at the other tensioning member end to one or the other of the lower points of the pole to be in the same plane as the pole. The tensioning member is positioned within the tent and distortion of pole shape laterally to the longitudinal axis of the tent is resisted.

U.S. Pat. No. 4,465,757 discloses a double walled tent supported by outwardly leaning pairs of arches and an interconnecting flexible ridge member. The ridge member is associated with the outer wall or cover, so that the outer wall may be tensioned to form the shelter. An inner wall or cover is suspended from the outer wall by netted webbing which allows circulation between the walls.

U.S. Pat. No. 3,970,096 discloses a tent comprised of outer nonporous and inner porous layers disposed in spaced relation to each other, with a continuous air passageway there between. Compression tent supporting means comprises a plurality of demountable, substantially semicircular rods, preferably formed of fiberglass, forming arched rafters, and of a plurality of relatively short pieces slidably interconnected to form two-rod units. These two-rod units are interconnected by a sleeve, slidably mounted on one unit, to slidably receive the end portion of the other. The arched rafters are spaced apart and aligned substantially parallel to each other and progressively decrease in diameter in a tent longitudinal direction. An inner tent layer is suspendedly supported by an outer layer by porous netting strips. At the end portions, nonporous, substantially semiannular shaped end members are provided which extend radially inwardly and angularly between the inner and outer tent layers. At the end portions, the outer tent layer is under tension by opposite, outwardly directed forces. All of the forces holding the tent in place are tension forces except forces acting through the tent rod units which are compression forces. All heat generated within the tent, such as that formed by human breathing or by the burning of a candle, rises upwardly in the tent and passes through the inner tent layer, thence longitudinally through the passageway between the inner and outer tent layers and thereafter out through the tent end portions by way of breather passageways disposed in end portions of the tent.

As discussed previously, it is important that an emergency fire shelter have ease of transport by fire fighters and be protected during prolonged periods of storage. Further, it is desirable that the shelter is fast and easy to deploy. Numerous patents disclose rapidly deployable devices such as belt packs and the like.

U.S. Pat. No. 5,921,388 discloses a rapidly deployable fire shelter that employs a flexible web handle attached directly to a protective pouch holding the folded fire shelter. The handle includes opposed fastener surfaces that may be interposed between the closure normally holding the cover to the protective pouch. The handle extends outside the pouch to be grasped by the firefighter and pulled so as in a single motion to release the cover from the pouch and extract the fire shelter without loss of control of the fire shelter.

U.S. Pat. No. 5,619,955 discloses a device for providing a gripping aid for the tandem passenger of a vehicle is described. The device includes a harness worn by the operator of the vehicle. The harness is secured around the upper region of the operator's torso, and the gripping handles are attached to the harness such that the passenger can be positioned closer to the operator while comfortably gripping the handles. An adjustable, quick release clasp allows the operator to quickly put on, remove, and adjust the harness.

U.S. Pat. No. 5,341,973 discloses a low profile backpack system which includes a mechanism for allowing free movement of the shoulder straps as the wearer moves, bends, twists from side to side, etc. The inventive mechanism comprises a buckle having a pair of transverse elongated slots. The buckle is fixed to the top of the pack by means of a single vertically oriented strap which passes through the lower of the, two slots. A second strap passes through the upper slot and has its ends fixed to an end of each of two shoulder straps adapted to fit over the shoulders of the wearer. An additional feature is the provision of a quick release fire shelter on the pack which may be deployed by one hand. The shelter is stored in a rectangularly shaped pouch depending from the bottom of the pack. An open end of the pouch is selectively closed by a flap secured by Velcro fasteners. Pulling a release strap depending from the pouch first disengages the fasteners. Further pulling of the release strap causes the folded safety tent to be ejected from a plastic housing in which it is stored within the pouch.

U.S. Pat. No. 4,943,252 discloses a quickly inflatable survival device for skiers comprising a protective and buoyant plurality of concentric spheres made of flexibly impervious material which is stored uninflated around the waist in a belt pack using a detachable belt, and covered with a detachable flexible cover. To activate when needed, an inflation pull ring connected to a pressure vessel and valve is manually pulled to release a pressurized gas into the chambers between the inner sphere wall and the outer sphere wall, the sphere walls being limited in separation by the use of wall partition segments having air communications openings to allow free air flow throughout the chambers. Immediately after pulling the inflation ring, the person crouches down and the sphere is very quickly and forcefully expanded, detaching the cover, to its inflated spherical configuration and totally encloses the person, providing protection and buoyancy in snow avalanche environments. Deflation is accomplished using the pressure relief valve, then either exit enclosure is opened using the fabric handles and the occupant releases the belt and steps out of the device.

U.S. Pat. No. 4,858,797 discloses a backpack for use in carrying hose, such as fire hose, to locations where it is needed. The backpack includes a rigid metallic frame having at one end a hose support shelf on which at least two spirally coiled rolls of fire hose may be carried. Quickly engageable and releasable straps are provided to bind the coils of fire hose to the back frame, and shoulder straps and a waist strap are provided to suspend the backpack on the back of the wearer. All that is required of the wearer to release and deploy one or more coils of hose from the backpack is to tug on one end of a flexible cable, with the result that the quick-release straps that bind the coils to the frame are released, thus enabling the coils of hose to be deployed by a mere shrug of the shoulders.

However, there remains a need for a material that is resistant to radiant and convective heat. Further, there is a need for an improved emergency fire shelter design that improves the volume to surface area ratio and can be used in a kit by firefighters.

BRIEF SUMMARY OF THE INVENTION

A first embodiment of the invention is a flexible, layered material resistant to radiant and convective heat comprising: at least two aluminum foil layers, at least one silica based cloth layer, and at least one fiberglass cloth layer; wherein the layers are sewn together or bonded with adhesive; wherein a first aluminum foil layer is an outermost layer that faces the radiant and convective heat; and wherein all adhesives are contained between said first aluminum foil layer and said second aluminum foil layer.

Another embodiment of the claimed invention is an emergency fire shelter comprising: a floor and a canopy connected thereto, wherein said floor is oval in shape and has an opening therein; wherein said canopy is semi-capsular in shape; and wherein said floor and canopy are constructed of a material that is heat and fire resistant.

Another embodiment of the claimed invention is a fire shelter storage system allowing rapid deployment comprising: an emergency fire shelter comprising a floor and a canopy connected thereto, wherein said floor is oval in shape and has an opening therein; wherein said canopy is semi-capsular in shape; and wherein said floor and canopy are constructed of a material that is heat and fire resistant; an outer protective pouch sized to receive the emergency fire shelter unit through an open end of the pouch, the pouch further including a cover detachably covering the open end as retained by a releasable fastener attaching a portion of the cover to a portion of the pouch; and a handle having one end attached to the emergency fire shelter unit and sized so that when the fire shelter unit is received within the pouch and the cover is in place over the opening, the handle may extend out of the pouch adjacent to the releasable fastener to present an exposed end to a user; whereby the emergency fire shelter may be removed from the pouch by applying a force to the handle to release the releasable fastener and extract the fire shelter unit from the pouch.

BRIEF DESCRIPTION OF THE DRAWINGS

FIG. 6 is a perspective view of a protective pouch having an attached cover and holding an emergency fire shelter, the latter contained in a protective vinyl bag having an attached extraction handle per the present invention;

FIG. 7 is a fragmentary cross-section taken along line 2—2 of FIG. 1 showing the pouch of FIG. 1 when closed, prior to deployment, and showing the interfitting of the handle between fasteners of the pouch and cover to engage those surfaces so as to hold the cover closed and to retain the fire shelter in the pouch;

FIG. 8 is a figure similar to that of FIG. 2 showing a pulling outward of the handle during initial stages of deployment of the fire shelter so as to release the cover from the front edge of the pouch, extracting the fire shelter prior to release of the handle from the cover.

DETAILED DESCRIPTION OF THE PREFERRED EMBODIMENT

Figure 1:
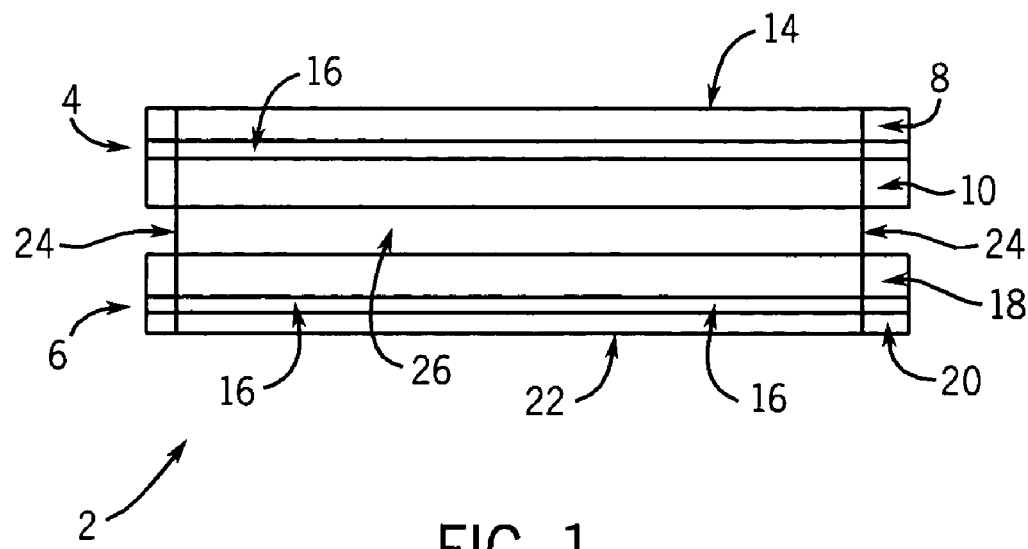
FIG. 1 is a cross-sectional view of an embodiment of a flexible, layered material resistant to radiant and convective heat.

The preferred embodiment of the subject invention will now be disclosed in detail in conjunction with the figures, wherein like parts are designated by like reference numerals, throughout the several views. While the present inventive fire and heat resistant material is applicable for use in a variety of settings, a preferred embodiment, discussed below, is an emergency fire shelter. More particularly, one of the preferred embodiments is a fire shelter storage system that may be quickly deployed and which contains an emergency fire shelter constructed of the inventive fire and heat resistant material.

In general the inventive material is a flexible, layered material resistant to radiant and convective heat. There must be at least four layers in the inventive material with at least two layers being aluminum foil layers, at least one layer a silica based cloth layer, and at least one layer being a fiberglass cloth layer. The number of each type of layer and the positioning of layers may be varied depending upon the application is which the layered material is to be used. However, the inventive layered material must have the following features.

A first aluminum foil layer is disposed as an outermost layer near a source of radiant and convective heat. The first aluminum foil layer reflects radiant energy. This prevents much of the radiant heat from passing into the layered material below.

Each layer is either sewn to adjoining layers or is bonded to adjoining layers with adhesive. A second aluminum foil layer is positioned such that any adhesive used to bind layers together are located between the first and second aluminum foil layers. Sandwiching all adhesives between the first and second aluminum foil layers prevents gases that may be produced by the heating of adhesives from escaping from the layered material on the side opposite of the radiant and convective heat source. The innermost layer must be non-emitting for thermal radiation. The first and second aluminum foil layers may not be positioned next to one another. Additional aluminum foil layers, however, may be disposed throughout the inventive material.

At least one silica based cloth layer and at least one fiberglass cloth layer must be disposed within the inventive material. The woven silica based cloth layer(s) prevent much of the convective heat from passing through the inventive material while the fiberglass layer(s) provide strength. Additional silica cloth layers and fiberglass layers may be disposed throughout the inventive material.

In use, fire and heat resistant materials operate under two scenarios, no hot gas contact and hot gas contact. The following is an example of such materials used in a fire shelter where there is no hot gas contact. In this scenario, the incident energy (radiation) strikes the surface of the shelter. Most, approximately 95%, is reflected back to the environment. The remainder is absorbed and results in a heating of the surface. The temperature of the material (outer aluminum) rises and, because aluminum is a poor radiator, the energy is conducted through to the silica cloth and air spaces within the cloth matrix. Some energy is also lost to the environment (air) because the surrounding air is cooler than the aluminum layer. Silica cloth is a much better radiator so now there are multiple modes of energy transfer in response to a temperature difference between the back side of the aluminum (hot) and the air layer between the inner and outer laminate layers. Energy is transferred across the air space to the inner laminate which in turn rises in temperature. Because the inner layer is now warmer than the interior air in the shelter energy is transferred through the inner layer and the interior aluminum surface becomes warmer. Because it is a very poor radiator, the inner aluminum layer transfers energy to the air inside the shelter via convection.

In contrast, these materials used in a fire shelter where there is hot gas contact (or flame contact), the reflective properties of the outer aluminum layer don't matter as much because the dominant energy transfer mode is convection. Outer layer gets hot and the remaining mechanisms are as with the case above. Things happen much more quickly because the outer layer is now immersed in a hot gas and can only gain energy from the gas. In hot gas contact scenarios, the energy flow is one way, towards the interior.

A preferred embodiment of the inventive layered material is illustrated in FIG. 1. Referring now to FIG. 1, inventive layered material 2 is comprised of an outer shell 4 and an inner shell 6. Outer shell 4 is constructed of a first aluminum foil layer 8 and a woven silica cloth based layer 10 and is disposed nearest to a fire and/or heat source 12. First aluminum foil layer 8 serves to reflect radiant heat generated by fire and/or heat source 12. First aluminum foil layer 8 is between 0.5 to 2.0 mil in thickness, preferably between 0.8 to 1.2 mil, most preferably approximately 1.0 mil in thickness.

First aluminum foil layer 8 is laminated with an adhesive 16 to woven silica based cloth layer 10. Woven silica based cloth layer 10 prevents much of the convective heat from passing through the inventive material. Woven silica based cloth layer 10 is 6 to 13 oz. cloth, preferably 8 to 12 oz. cloth, most preferable 10 oz. cloth (Although often 10 oz. cloth may weigh in the range of 9 to 11 oz.). Woven silica cloth layer 10 can be obtained through Hi Tech Products, Inc. in Delaware.

Adhesive 16 used to bind layers of outer shell 4 is preferably a high temperature, non-toxic glue. If material 2 is to be used in the construction of an emergency fire shelter, then Adhesive 16 must be a high temperature, non-toxic glue. The preferred adhesive 16 is a high temperature, non-toxic glue proprietary to Cleveland Laminating, Corp. of Cleveland, Ohio.

Inner shell 6 is comprised of a fiberglass cloth layer 18 and a second aluminum foil layer 20. Maximum flexibility, strength and a low weight are desired when selecting fiberglass cloth layer 18. Style number 1080-D fiberglass cloth, available commercially, obtained through Cleveland Laminating, Corp. of Cleveland, Ohio is preferred for fiberglass cloth layer 18. Second aluminum foil layer 20 is laminated with an adhesive 16 to fiberglass cloth layer 18. Again, a high temperature, non-toxic glue as discussed above is preferred.

Second aluminum foil layer 20 serves to minimize re-radiation of heat that passes through other layers of material 2. Further, second aluminum foil layer 20 is an innermost layer of material 2 so that any gases produced by the heating of adhesives or other substance (i.e. starches or sizing) are prevented from escaping from material 2 on the side opposite of the fire and/or heat source 12. Second aluminum foil layer 20 is between 0.5 to 2.0 mil in thickness, preferably between 0.5 to 0.8 mil, most preferably approximately 0.65 mil in thickness.

Outer shell 4 and inner shell 6 are sewn together at seam 24 such that an air gap 26 is created between outer shell 4 and inner shell. Air gap 26 creates additional insulation which further retards the passage of heat toward the inside of material 2.

The "pup tent" style emergency fire shelters currently in use have flat, triangular ends that are substantially perpendicular to the ground when the shelter is in use. These ends reflect radiant energy to the ground immediately adjacent to the fire shelter and increase the likelihood that fuel in close proximity to the shelter will be ignited. Fires immediately adjacent to the shelter might damage the shelter prior to the arrival of the flame front. The rounded ends of the inventive fire shelter illustrated in FIGS. 2–5 forces much of the radiant heat to be dispersed instead of heating the ground adjacent to the shelter.

The "pup tent" style emergency fire shelters also have a large surface area to volume ratio. This allows more radiant heat to transfer to the material and then into the fire shelter. The inventive fire shelter has a smaller surface area to volume ratio which reduces the amount of heat transfer to the inside of the inventive fire shelter.

Figure 2:
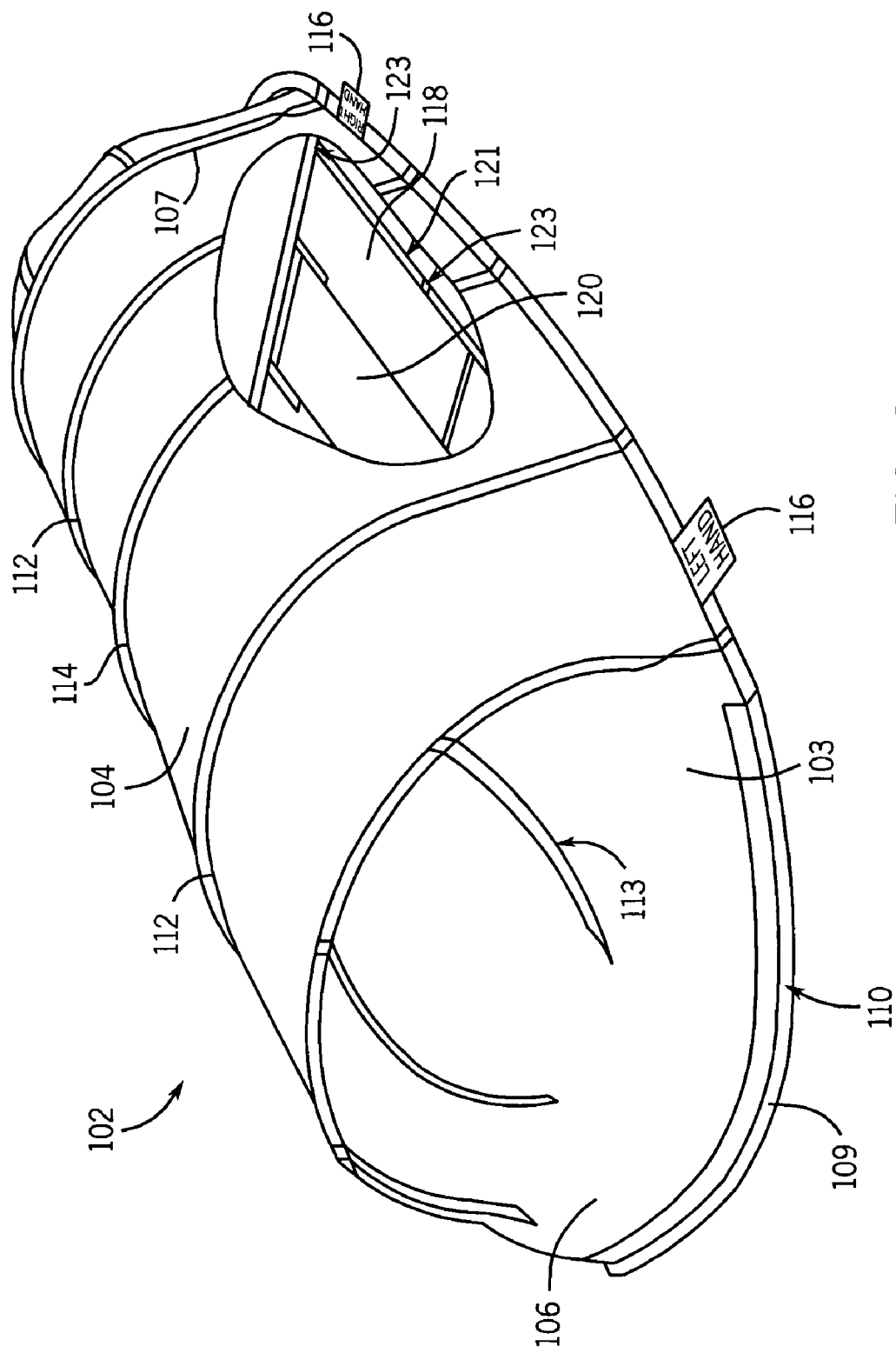
FIG. 2 is a perspective view in cut away of a deployed emergency fire shelter.

Referring now to FIG. 2, fire shelter 102 is semi-capsular in shape. A fire shelter canopy 103 of fire shelter 102 is made up of a main body 104 and with two shelter ends 106 attached at both ends of main body 104. Main body 104 is shaped like a half cylinder while two shelter ends 106 are shaped like ¼ spheres. Main body 104 and shelter ends 106 are sewn together along end seams 107. In the preferred embodiment, main body 104 is constructed of two pieces sewn together at mid-point seam 114. Structural seams 112 are seams where fabric of main body 104 is folded over and sewn. Structural seams 112, end seams 107 and mid-point seam 114 limit damage to other areas of fire shelter 102 in the event that one section sustains damage. Shelter end seams 113 allow for shaping of shelter ends 106.

A floor 118 is sewn to main body 104 at perimeter seam 110 which extends around perimeter of fire shelter 102. Seam tape 109 is disposed around the entire perimeter of fire shelter 102 and is affixed by perimeter seam 110. In FIG. 2, seam tape 109 is not shown on a portion of the perimeter of fire shelter 102 in order to allow a better view of the intersection of perimeter seam 110 with structural seams 112, end seams 107 and mid-point seam 114 intersect. Floor 118 is shaped like an oval with a hole 120 disposed therein. Hole 120 is preferably rectangular in shape and is used by a firefighter to gain access to fire shelter 102. More particularly, hole 120 is approximately eight inches in width and fifty-eight inches in length. This affords a firefighter easy access to fire shelter 102 while using their body (not shown) once inside to weigh down fire shelter 102. Handles 116 are sewn into perimeter seam 110 to aid a firefighter in deploying fire shelter 102. One of handles 116 is marked to a right hand while a second is marked for a left hand. This ensures that a firefighter deploys fire shelter 102 with hole 120 close to (or facing) the firefighter for quicker entry.

In use, a firefighter deploys fire shelter 102 using handles 116. A firefighter then enters fire shelter 102 through hole 120. Because the perimeter of a firefighter's body is greater that the perimeter of hole 120, the firefighters body secures fire shelter 102 to the ground. In addition, the firefighter would slip his or her arms through straps 123 up to the elbow to positively hold the shelter down. Fire shelter 102 is preferably constructed of a fire and heat resistant material. More preferably, fire shelter 102 is constructed of material 2 described above.

Figure 3:
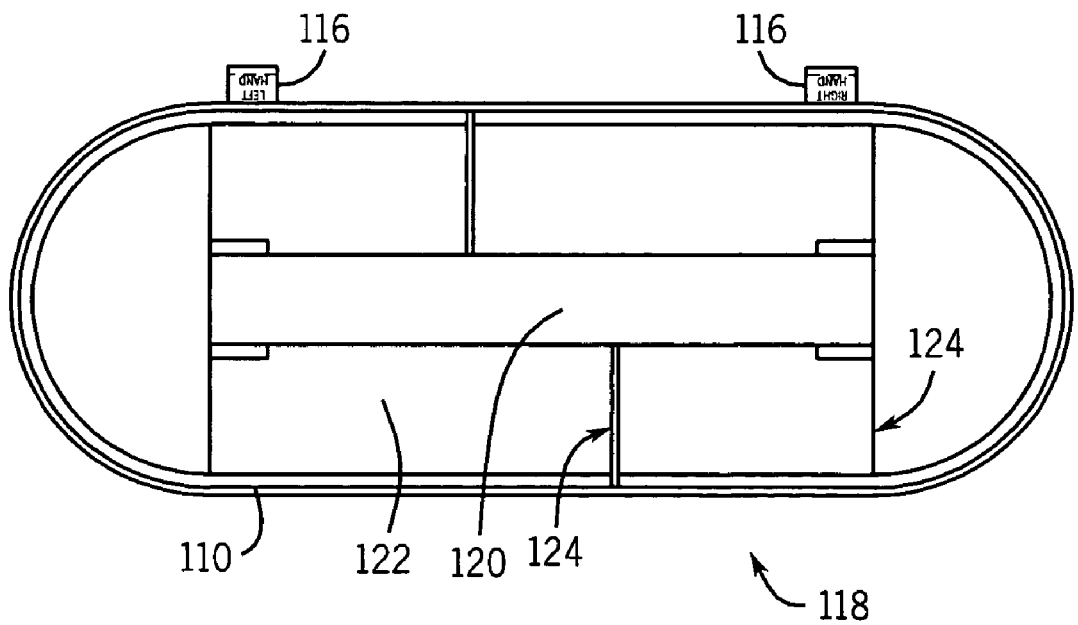
FIG. 3 is a bottom perspective view of a deployed emergency fire shelter.

Referring now to FIG 3, a view of floor 118 from under fire shelter 102, floor 118 is made up of various floor pieces 124 that are sewn together at floor seams 122. Floor 118 has a hole 120 that is preferably rectangular in shape and is used by a firefighter to gain access to fire shelter 102. More particularly, hole 120 is approximately eight inches in width and fifty-eight inches in length. Floor 118 is sewn to canopy 103 at seam 110 which is also used to attach handles 116 to fire shelter 102. Floor 118 is constructed of a silica-based cloth laminated each side with an aluminum foil layer. The aluminum foil layer is between 0.5 to 2.0 mil in thickness, preferably between 0.5 to 0.8 mil, most preferably approximately 0.65 mil in thickness. Silica-based cloth layer is 5 to 13 oz. cloth, most preferable 6.5 oz. cloth.

Figure 4:
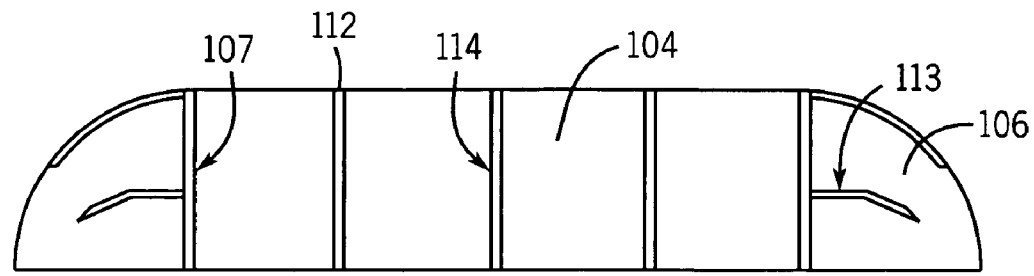
FIG. 4 is a side perspective view of a deployed emergency fire shelter.
Figure 5:
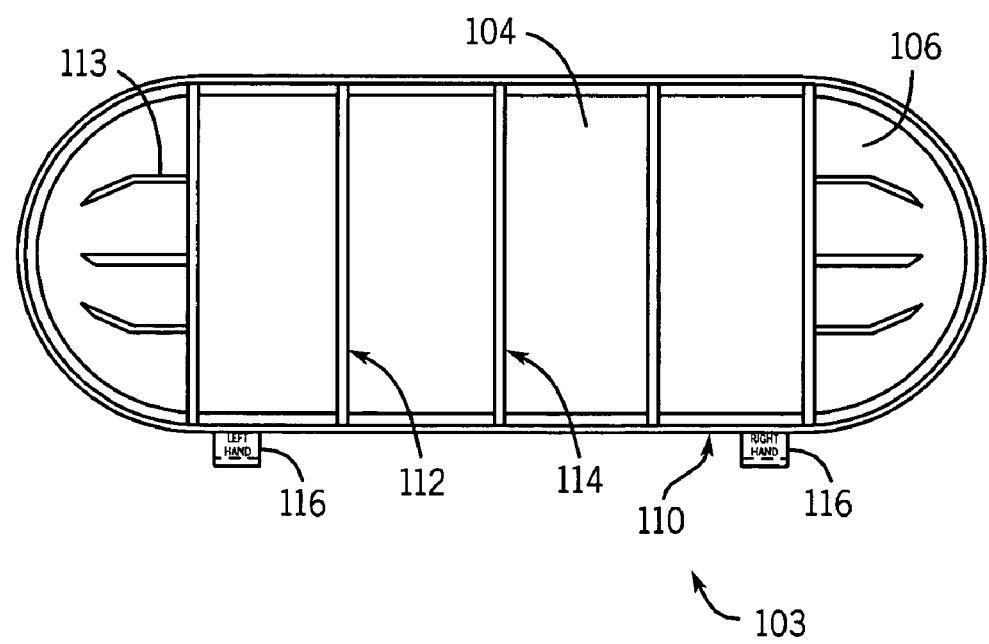
FIG. 5 is a top perspective view of a deployed emergency fire shelter.

Referring now to FIGS. 4 and 5, canopy 103 of fire shelter 102 is made up of a main body 104 and two shelter ends 106. Main body 104 and shelter ends 106 are sewn together along end seams 107. In the preferred embodiment, main body 104 is constructed of two pieces sewn together at mid-point seam 114. Structural seams 112 are seams where fabric of main body 104 is folded over and sewn. Structural seams 112, end seams 107 and mid-point seam 114 limit damage to other areas of fire shelter 102 in the event that one section sustains damage. Shelter end seams 113 allow for shaping of shelter ends 106. In FIG. 5 only, canopy 103 is sewn to floor 118 (not shown) at perimeter seam 110.

Referring now to FIG. 6, a fire shelter assembly 210 includes an outer pouch 212 constructed of nylon duck or the like to provide a generally rectangular volume having an open end 214. A rigid plastic sleeve 216 fits within the pouch 212 so as to support the pouch 212 against a crushing of its contents. Fitting within the sleeve 216 is the vinyl bag 218 holding within it the fire shelter 102.

As is understood in the art, the vinyl bag 218 includes pull-tabs 222 which may be grasped by the firefighter to rip open the vinyl bag 218 after it is removed from the pouch 212 to thereby free the fire shelter 102. The upper edge of the vinyl bag 218 is heat-sealed to prevent moisture and other contaminants from contacting the contained fire shelter 102 and produce a lip 224 to which one end of a nylon web 226 may be sewn. Sewing the nylon web 226 to the lip 224 provides a broad-area attachment between the nylon web 226 and the vinyl bag 218 to minimize the chance of a tearing of the vinyl bag 218 from force applied by the nylon web 226. The vinyl bag 218 is placed in the pouch 212 with the lip 224 extending from the open end 214.

A cover 228 constructed of the same material as the pouch 212 is sewn along a rear hinging edge to the rear edge of the open end 214 of the pouch 212 so as to move freely between an open position (shown in FIG. 6) and a closed position (shown in FIG. 7) where a front lip 230 of the cover 228 passes over a front edge 232 of the pouch 212. Sewn to an inner surface of the front lip 230 of the cover 228 is hook material 234 such as forms part of a hook-and-loop fabric fastener such as sold under the trade name of Velcro. Corresponding loop material 236 is sewn to the outer surface of the front edge 232 of the pouch 212.

Referring now to FIGS. 6 and 7, the nylon web 226 extends upward from the lip 224 of the vinyl bag 218, as contained in the pouch 212, and may be folded forward and then downward to pass over the front edge 232 of the pouch 212. At that point of crossing, hook material 238 may be attached to the nylon web 226 immediately adjacent to the loop material 236 so as to fasten the nylon web 226 releasably against the front edge 232 of the pouch 212.

The cover 228 may then be closed as shown in FIG. 7 so that the front lip 230 lies over top of the front edge 232 of the pouch 212, sandwiching the nylon web 226 there between. To the portion of the nylon web 226 adjacent to the hook material 234 on the cover 228 is sewn loop material 240 so as to engage the hook material 234 on the cover 228 and to hold the cover 228 in a closed position via the interconnection of the nylon web 226 with the pouch 212. A handle portion 242 of the nylon web 226 may extend beyond the cover 228 to the outside of the pouch 212, permitting a firefighter to grasp the nylon web 226 at the handle portion 242 by sliding a hand (not shown) along the front of the pouch 212.

Referring still to FIG. 7, one or more belt or backpack hangers 244 may be attached to the rear side of the pouch 212 according to methods well known in the art, to suspend the pouch 212 from a belt or backpack.

Referring now to FIG. 8, the handle portion 242 may be pulled away from the front edge 232 of the pouch 212 and outward toward the open end 214 of the pouch 212 so as to release the loop material 236 on the pouch 212, and forming half of a releasable connector from the hook material 238 on the nylon web 226, thereby opening cover 228 as shown in FIG. 8. Further outward motion of the handle portion 242 detaches loop material 240 attached to nylon web 226 from hook material 234 attached to the front lip 230 of the cover 228, wholly releasing the nylon web 226 from the cover 228 and pouch 212. Further outward motion completely extracts the vinyl bag 218 from the pouch 212 while maintaining the fire shelter 102 in control of the firefighter via the handle portion 242.

The web 226 and/or handle portion 242 may then be used as one point of purchase for the gripping and tearing away of pull-tabs 222 at the site of deployment. At this time, the backpack holding the pouch 212 will have been abandoned and a second hand will be available.

Referring still to FIG. 8, in actual use, the fire shelter 102 does not come out of the sleeve 216 until hook material 234 and loop material 240 release, but is shown lifted from the sleeve 216 for clarity.

In the closed configuration of FIG. 7, prior to deployment, it will be understood that the vinyl bag 218 holding the fire shelter 102 is secured by two paths of contact to the firefighter, either directly to the pouch 212 (attached to the firefighter by belt loops or via the firefighter's backpack) or to the pouch 212 via the cover 228. Generally, the forces on the fire shelter 102 against the cover 228 during normal activity of the firefighter will act on the materials 234, 240, 238 and 236, in a shearing direction, against which such fasteners are strongest. In contrast, outward motion as indicated in FIG. 7 of the handle portion 242 peels away loop material 236 from hook material 238 in a manner requiring less force. Thus accidental deployment of the fire shelter 102 is reduced. The possibility of accidental opening of the cover 228 by handle portion 242 catching on brush or the like is further reduced by the smooth end of handle portion 242, which may be a rolled seam and the flexibility of the handle portion 242.

Further, should the cover 228 be accidentally opened, the fire shelter 102 will retain, for a period of time, its connection with the cover 228 through hook and loop materials 234 and 240, increasing the chance that such an accidental deployment will be detected and reducing the chance that the fire shelter 102 will simply fall out on the ground unnoticed.

The invention being thus described, it will be obvious that the same may be varied in many ways. Such variations are not to be regarded as a departure from the spirit and scope of the invention and all such modifications are intended to be included within the scope of the following claims.

We claim:

1. An emergency fire shelter having a floor and a canopy connected thereto in which the floor is oval in shape and has an opening therein for a person to gain access to the fire shelter and the canopy is semi-capsular in shape having a main body shaped like a half cylinder and two ends shaped like ¼ spheres, the floor and canopy being made of a flexible, layered material resistant to radiant and convective heat, wherein the layered material has a first foil layer and a second foil layer, at least one silica based cloth layer, and at least one fiberglass cloth layer, wherein the first foil layer is an outermost layer having a heat reflective side and the second foil layer is an innermost layer joined to the outermost layer, the at least one silica based cloth layer and the at least one fiberglass cloth layer being disposed on opposite sides of an air layer and between the first and second foil layers such that at least a portion of the at least one silica based cloth layer is spaced apart from the at least one fiberglass cloth layer by the air layer.

2. The emergency fire shelter of claim 1, wherein said layered material comprises an outer shell and an inner shell, wherein said outer shell includes said first foil layer which is disposed nearest to the radiant and convective heat and said inner shell includes said second foil layer.

3. The emergency fire shelter of claim 2, wherein said outer shell is a laminate of said first foil layer and said at least one silica based cloth layer, wherein said inner layer is a laminate of said second foil layer and said fiberglass cloth layer, and wherein said inner and outer shells are joined together along peripheral sides such that at least a portion of the inner and outer shells are spaced apart inwardly of the peripheral sides by the air layer.

4. The emergency fire shelter of claim 3, wherein said first foil layer and said second foil layer are aluminum foil that is 0.5 to 2.0 mils in thickness and said silica based cloth layer is 6 to 13 ounce cloth.

5. The emergency fire shelter of claim 4, wherein said first aluminum foil layer is 0.8 to 1.2 mils in thickness, said second aluminum foil layer is 0.5 to 0.8 mils in thickness and said at least one silica based cloth is 9 to 11 ounce cloth.

6. The emergency fire shelter of claim 5, wherein said first aluminum foil layer is about 1.0 mil in thickness, said second aluminum foil layer is about 0.65 mil in thickness and said woven silica cloth is 10 ounce cloth.

7. The emergency fire shelter of claim 3, wherein the outer shell is formed by adhesive bonding the first foil layer to the at least one silica based cloth layer and the inner shell is formed by adhesive bonding the second foil layer to the at least one fiberglass cloth layer, and wherein all adhesives are contained between the first and second foil layers.

8. An emergency fire shelter having a floor and a canopy connected thereto in which the floor is oval in shape and has an opening therein for a person to gain access to the fire shelter and the canopy is semi-capsular in shape having a main body shaped like a half cylinder and two ends shaped like ¼ spheres, the floor and canopy being made of a flexible, layered material resistant to a radiant and convective heat source, the wherein the layered material includes:

an outer shell containing a first foil layer which is disposed nearest to the radiant and convective heat source such that the first foil layer has a reflective side that faces the radiant and convective heat source;

an inner shell disposed inwardly from the outer shell, the inner shell containing a second foil layer and being joined to the outer shell; and at least one silica based layer and at least one fiberglass cloth layer both disposed between the first and second foil layers, wherein the silica based layer is disposed adjacent to the first foil layer and the fiberglass cloth layer is disposed adjacent to the second foil layer, and wherein at least a portion of the silica based layer is spaced from the fiberglass cloth layer inside of a periphery of the outer and inner shells by an air layer.

9. The emergency fire shelter of claim 8, wherein the outer shell is formed of a laminate of the first foil layer and the silica based layer and wherein the inner shell is formed of a laminate of the second foil layer and the fiberglass cloth layer.

10. The emergency fire shelter of claim 8, wherein the silica based layer is a silica cloth based layer.

* * * * *